(12) United States Patent
Natanzon et al.

(10) Patent No.: US 10,853,183 B2
(45) Date of Patent: Dec. 1, 2020

(54) SERVERLESS APPLICATION OPERATIONAL RECOVERY AND MANIFEST CREATION

(71) Applicant: EMC IP Holding Company LLC, Hopkinton, MA (US)

(72) Inventors: Assaf Natanzon, Tel Aviv (IL); Amit Lieberman, Raanana (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 74 days.

(21) Appl. No.: 15/964,570

(22) Filed: Apr. 27, 2018

(65) Prior Publication Data

US 2019/0332483 A1 Oct. 31, 2019

(51) Int. Cl.
  *G06F 11/14* (2006.01)
  *G06F 11/30* (2006.01)
  *G06F 16/2458* (2019.01)

(52) U.S. Cl.
  CPC ...... *G06F 11/1448* (2013.01); *G06F 11/1464* (2013.01); *G06F 11/302* (2013.01); *G06F 16/2458* (2019.01)

(58) Field of Classification Search
  CPC ............. G06F 11/1448; G06F 11/1464; G06F 11/302; G06F 16/2458; G06F 11/1451
  See application file for complete search history.

(56) References Cited

U.S. PATENT DOCUMENTS

| | | | | |
|---|---|---|---|---|
| 2007/0162903 | A1* | 7/2007 | Babb, II | G06F 8/75 717/154 |
| 2009/0327630 | A1* | 12/2009 | Akamatsu | G06F 11/1451 711/162 |
| 2015/0006587 | A1* | 1/2015 | Segaran | G06F 16/9024 707/798 |
| 2016/0085527 | A1* | 3/2016 | de Lima Ottoni | G06F 16/9024 717/157 |
| 2017/0033979 | A1* | 2/2017 | Cradick | H04L 41/0816 |
| 2017/0366623 | A1* | 12/2017 | Shi | H04L 67/32 |
| 2018/0088936 | A1* | 3/2018 | Tanimoto | G06F 8/658 |
| 2019/0205184 | A1* | 7/2019 | Zhang | G06F 9/5083 |

\* cited by examiner

*Primary Examiner* — S. Sough
*Assistant Examiner* — Stephen D Berman
(74) *Attorney, Agent, or Firm* — Workman Nydegger

(57) ABSTRACT

Systems and methods for backing up and restoring serverless applications are provided. A serverless application is queried to identify the functions and services used. These functions and services are transformed into a manifest or graph that allows the relationships of the serverless application to be identified in an automated manner. The serverless application can be backed up and/or restored using the manifest.

18 Claims, 3 Drawing Sheets

SERVERLESS APPLICATION OPERATIONAL RECOVERY AND MANIFEST CREATION

FIELD OF THE INVENTION

Embodiments of the present invention relate to systems and methods for providing data protection operations to serverless applications. More particularly, embodiments of the invention relate to systems and methods for backing up serverless applications. Embodiments of the invention further relate to systems and methods for automatically creating a manifest for a serverless application that is used in performing a backup operation and/or a restore operation.

BACKGROUND

Serverless applications or serverless architecture are terms that often refer to applications that are packaged as stateless containers. These containers typically response to external events and interact with backend services. The terms do not mean that no servers are involved in the operation of a serverless application.

Serverless infrastructures that enable serverless applications, such as Amazon's AWS Lambda, allow an entity or user to execute code or software without provisioning or managing servers. A customer is typically required to pay only for compute time. A customer is not charged when their code is not executing. This advantageously allows an entity or user to reduce operational costs and simplifies scaling.

Because serverless applications are an emerging technology, concerns such as security or data protection may not be fully taken into consideration. This can create gaps and vulnerabilities for entities or users that adopt this technology.

For example, the ability to backup a serverless application and/or restore a serverless application is complicated because the relationships between the various components of the serverless application are complex. In order to successfully backup/restore a serverless application, it is necessary to have an understanding of the relationships that exist between the components. Because serverless applications are often packaged as or include stateless containers, it is difficult to understand all of the conditions and relationships that may exist in a serverless application. In addition, tracking changes such as function upgrades, service additions/removals can become tedious.

In serverless platforms, much of the orchestration capabilities are delegated to third party vendors (e.g. AWS Lambda). Consequently, there is no guarantee that the application as a whole will have consistent backups. In fact, customers are usually concerned with the backing up the backend service. Unfortunately, this will not be sufficient when the conditions of the application have changed or a newer version of application function images have been uploaded.

Today, a customer can backup a serverless application by backing up all the services that the application uses. This is performed manually and is tedious and error prone manual work. In fact, this process conventionally requires multiple backup application components to be created and requires that the operation of these components be coordinated.

Even though many backend services have backup abilities, the challenge in the context of serverless applications is coordinating the backup of the backend services with other components of a serverless application. Serverless applications are dynamic in nature: services change and applications or containers are upgraded. These changes make coordinating the backup/restore difficult. This process is further complicated when attempting to restore to an older point in time.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
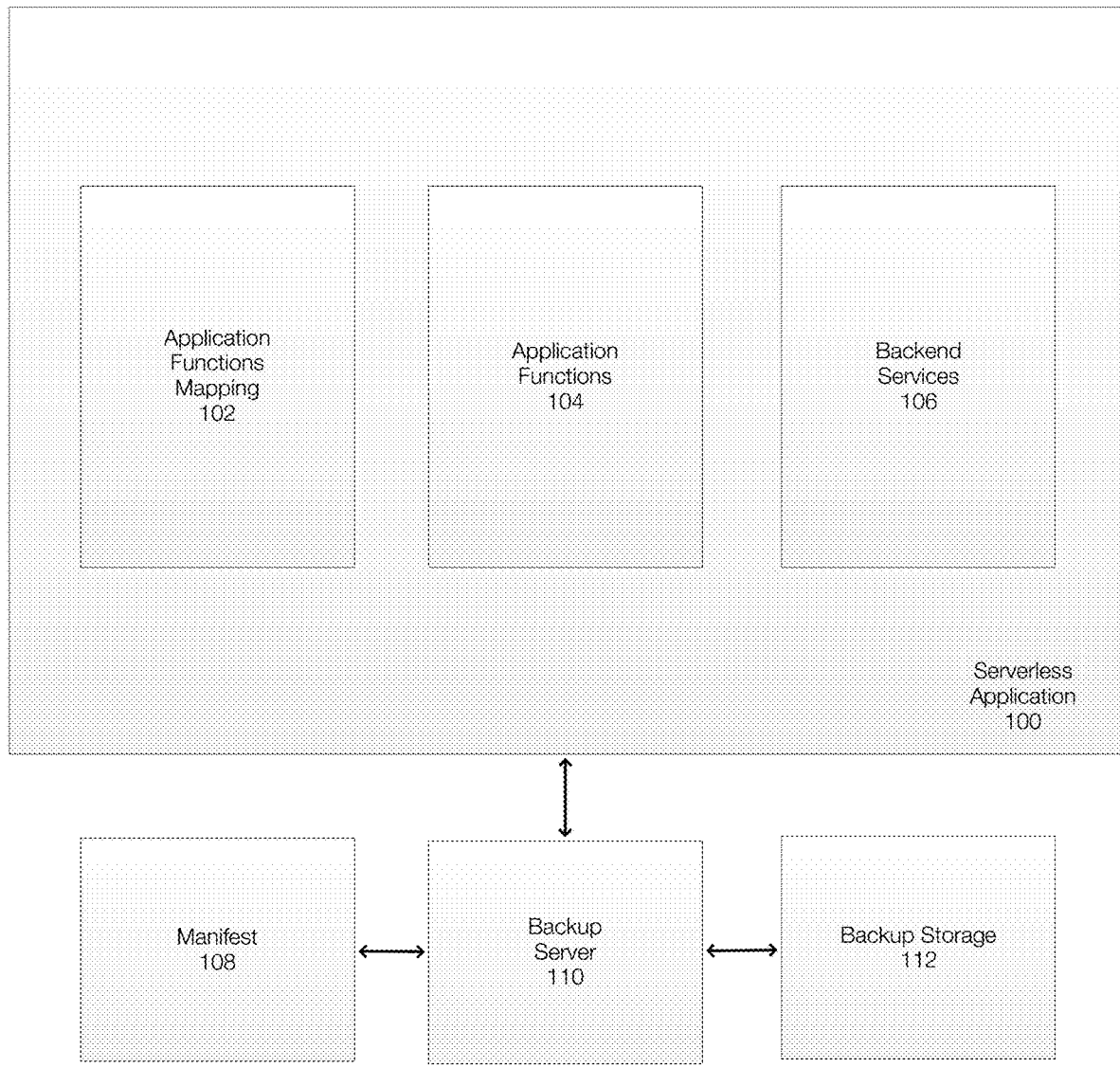
FIG. 1 illustrates an example of a serverless application and of a data protection system configured to perform data protection operations including backup and/or restore operations for the serverless application.

Embodiments of the invention relate to systems and methods for performing data protection operations for serverless applications. Protecting serverless applications or performing data protection operations includes at least backing up and/or restoring serverless applications.

Embodiments of the invention further relate to generating a manifest. A manifest allows relationships between the various components of a serverless application to be identifies such that a backup operation or a restore operation can be performed effectively and automatically. The manifest allows the serverless application to be defined and protected. The manifest also allows relationships between the components of a serverless application to be understood so that the serverless application can be backed up and/or restored successfully.

Serverless applications often depend on third-party services or backend services. This may be referred to as BaaS or "backend as a service". Serverless applications also depend on custom code that may be executed or in or from ephemeral containers. This may be referred to as FaaS or "Function as a Service". In one example, an ephemeral container relates to software that isolates applications. Thus, the software in one container is isolated from the software in another container.

Advantageously, ephemeral containers (or containers) allows multiple applications to be isolated on the same hardware. In addition, containers allow an application to be run anywhere. This further facilitates FaaS because a provider (e.g., a datacenter or a cloud provider) can store multiple applications that are isolated from each other and that are independent of each other.

In one example, a serverless application includes three types of required artifacts or components. Together, these artifacts allow the serverless application to operate in production.

The components of a serverless application include backend services. Databases, object stores, persisted messaging services, real-time communication systems, file storage, social networks, searching, authentication and authorization, and payment systems are examples of backend services. Every service that can store long term state for an application are also examples of backend services. Often, the data of a serverless application may be stored or processed in or by a backend service.

Another artifact or component of a serverless application relates to application functions. Application functions are a set of stateless functions packaged as containers that are invoked according to the application's function mappings. The application functions can interact with the backend services to read, write and store state or perform other tasks. A serverless application may include more than one function. Each function may be stored in its own container. Thus, the functions can be operated on (removed, upgraded, edited) independently of other functions of the serverless application.

Another artifact or component relates to the application's function mappings. A serverless application requires a set of conditions that instruct the platform to activate the application functions. Common examples of these conditions include reactions to events of backend services (e.g., an object uploaded to an S3 bucket, a transaction committed on a relational database, a message sent to or received by a queue). Other common examples are reactions to events at an assigned URL endpoint (e.g., when a post request arrives at my-app-dns/my-app-api/data). The conditions can be simple or complex.

When an event occurs, the event is effectively mapped to one or more functions, which are then performed. For example, detecting an image upload may cause the image to be stored, compressed, encrypted, or the like in the backend service. The exact function depends on the event (or request), the function, and the backend service.

FIG. 1 illustrates an example of a serverless application 100. The serverless application 100 includes application functions mapping 102, application functions 104, and backend services 106. When a backup operation or restore operation is performed, each of these components is backed up or restored. Embodiments of the invention perform the backup/restore operation using a manifest to ensure that all components are backed up or restored in a manner that allows the proper operation of the serverless application to be achieved.

In one example, the application functions mapping 102 maps events or requests to functions. The event or request may occur or be detected in more than one way. For example, an event at a backend service may be mapped to an application function. When a message is received as a message service (e.g., a backend service), an event has occurred. This event may then be mapped to one or more functions. The mapping can depend on various conditions (e.g., type of message, time of message, content, sending device, or the like). The event is then mapped to an application function 104 and the function is then performed. For example, the message may indicate that a client has a set of files to be uploaded to storage. This event is mapped to a function that uploads the files to the storage. The functions, as previously stated, may be embodied as containers that have no state.

FIG. 1 also illustrates a backup server 110 (or backup application) that may be configured to generate a backup of the serverless application 100. The backup server 110 may perform the backup operation based on a manifest 108, which may have been generated by the backup server 110. Often, the manifest 108 is generated or exists prior to performing the backup operation. Further, more than one manifest may exist. Point in time backups, for example, may each be associated with their own manifest such that the serverless application can be restored at various points in time.

In addition, the manifest 108 can be generated automatically. The generation of the manifest 108 typically requires that one or more queries be made to the serverless application 100. After the manifest is generated, a backup operation may be performed. The resulting backup may be stored in backup storage 112. The backup storage 112 may be any suitable device and may be cloud-based.

When taking into consideration continuity requirements (e.g., business continuity requirements), embodiments of the invention are able to perform operational recovery to curtained points in time as required, for example, by the application's service level agreement (SLA).

Embodiments of the invention thus relate to systems and methods that automatically create or generate the manifest 108. Embodiments of the invention are able to understand which set of components effectively constitute a single application and then protect that single application. Further, embodiments of the invention are able to understand the backend services used by the serverless application and create a manifest automatically to reflect this understanding and enable the performance of backup, restore, and/or other data protection operations.

In order to create the manifest 108, the backup server 110 (which may be implemented as a serverless application itself) may obtain a list of functions that a user or entity is using the serverless environment. This may be achieved by issuing a list-functions command to the serverless application. The triggers for each such function will also be obtained. The triggers may include how a function is configured to be called, the code of the function and the environment variables of the function, which usually describe the services the application uses, such as which databases, data stores, messaging services, etc. In addition to a list-function command, this information may be obtained by issuing commands such as get-function-configuration or get-function commands.

The functions/backend servers may describe more than one serverless application. Advantageously, embodiments of the invention have the ability to backup and restore at the level of a single application.

To create a backup of an application, it may be necessary to know which persistent services are used by the application and to back up all these persistent services, when backup is called. When a restore is called, it may be necessary to restore all of the relevant services as well.

A serverless application, as previously stated, includes multiple functions, multiple services (object storage, data bases), connectivity between the functions (i.e. function can call each other), mappings, and the like.

If there is more than a single application deployed on the same account, then functions which belong to different applications will not call each other, will not be triggered by the same trigger, and will not write or communicate with the service. This allows a single application to be identified during the creation or generation of a manifest and allows for the manifest to distinguish between multiple serverless applications.

In one example, a manifest may be created or generated as follows. Generating the manifest may include creating a graph, which represents the relationships present in a serverless application and which allows a single serverless application to be identified so that the backup/restore operations can be performed at the level of a single application.

The graph contains vertices for each service (for example an S3 bucket, a dynamo DB table, etc.). A vertex may be created for each function as well.

For each function, the trigger calling the function will be evaluated or processed. If the trigger is a persistent service (like an object store bucket), an edge will be created between the vertex of the function and the vertex of the service. The vertices can be created as the list of functions, environment variables, and triggers is parsed in response to the queries (get functions, list functions or other suitable command).

For each function, the environment variables defined by the function will be evaluated. If an environment variable references a persistent service, an edge will be created between the persistent service vertex and the function vertex.

The code of the functions will also be parsed to determine if a function calls or references another function. If a function calls another function an edge will be created between the functions.

A single serverless application may then be defined as the connected vertices or components of the graph. By way of example, if two (or more) components or vertices have no connection to the rest of the graph, this indicates that these components do not affect the persistent state of the other components in the rest of the graph. As a result, they can be treated as a separate application.

Because a service can be accessed directly via the code, the code may be parsed to identify services that are accessed and these relationships will be added to the manifest.

Services may also be identified by environment variables which are configured with the functions. The variables may identify a service for example such that the services to be backed up can be identified.

Once the notion of an application is obtained, all of the backend services and functions that the application is using are reflected in the graph or in the manifest. A backup copy of the application can then be generated in part by backing up each service and function if necessary. Further, the backup (and the restore) may be based on the generated manifest.

The manifest will include the current versions of the functions including the code (the code may be referenced in the manifest), and the list of services that needs to backed up. Every time a new function is created or a function is modified, the backup manifest will need to be changed or updated. A new manifest could also be generated as the old manifest may be used in restoring to a prior point in time.

The backup system may automatically call a detection process and create a new manifest. Embodiments of the invention allow the serverless application to be automatically detected and provide and the ability to backup the serverless application with no manual intervention. In addition, the manifest can be automatically changed or updated, which allows the process of automatically backing up the serverless application to continue even as the application changes or is updated.

Embodiments of the invention advantageously detect a serverless application automatically and provide the ability to back up the serverless application with no manual intervention. Embodiments of the invention further update the manifest automatically, which allows continuation of backups even in the context of application changes.

Figure 2:
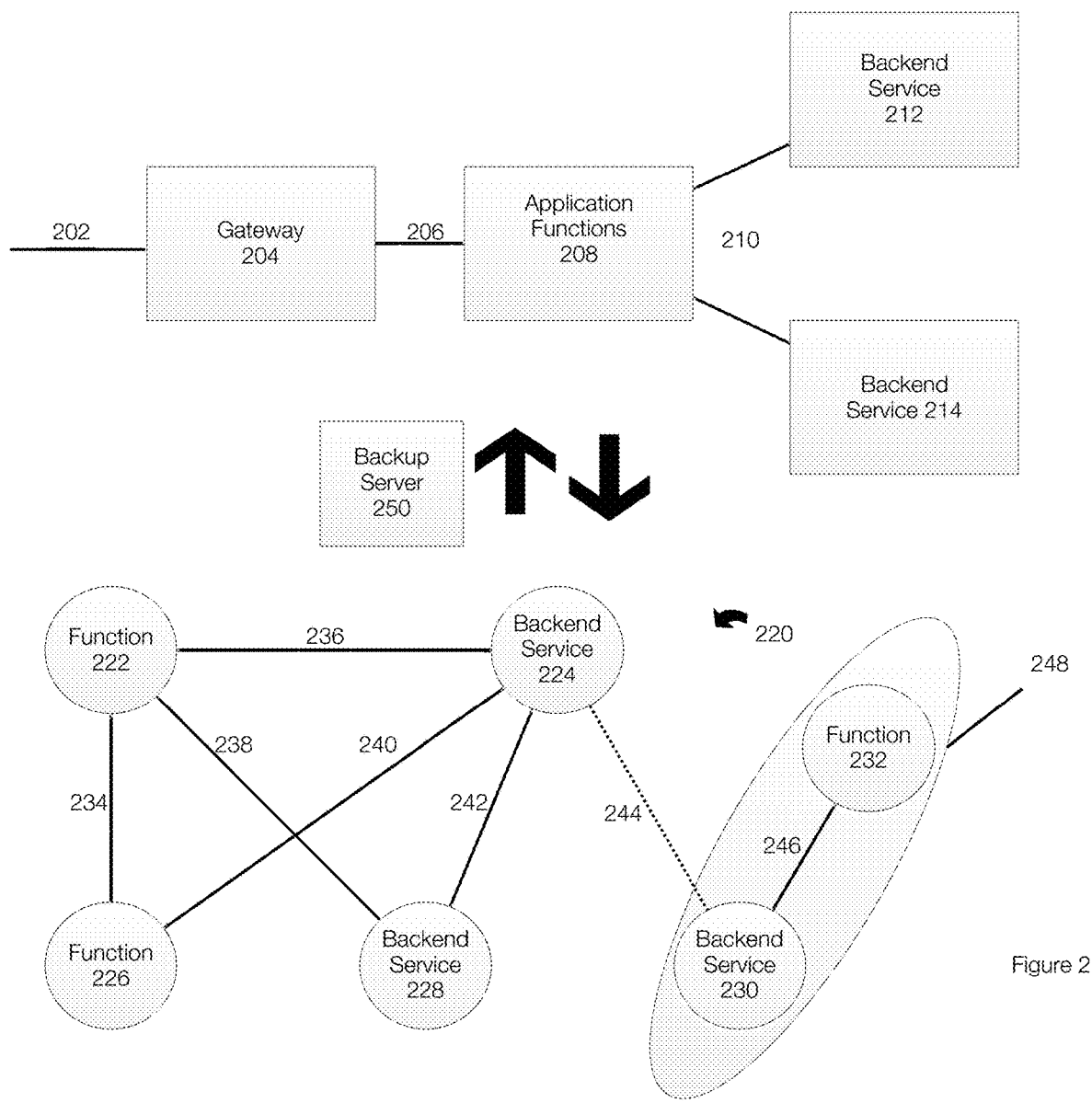
FIG. 2 illustrates an example of a manifest that is automatically generated and that is used to perform a data protection operation.

FIG. 2 illustrates an example of a serverless application and a manifest created or generated from the serverless application. FIG. 2 further illustrates an operation of a serverless application.

In FIG. 2, ab request 202 may detected by or received at a gateway 204. The gateway 204 may be a URL for example and the request 202 may be an http request (e.g., put, post, get). The serverless application may be cloud based and may be accessed by a client over the Internet. Example clients include desktop computers, laptop computers, mobile devices, tablets, or the like.

The gateway 204 is configured to process the request 202 with respect to application function mappings. In one example, the request 202 may be parsed and mapped to functions by the gateway 204. Thus, the gateway 204 may map the request or event to one or more functions. After identifying the appropriate function or functions for the request 202, the function is invoked 206. The invoked function may be embodied as a container. The function 208 then performs its corresponding function based on the request 202 or based on information received from the gateway 204.

The function 208 (or functions) may be instantiated from a container image. As previously stated, the serverless application or portions thereof may be embodied in ephemeral containers. The function 208 may interact 210 with one or more of the of the backend services 212 and 214.

The request 202 is an example of an event. Example events include uploading an object to a storage bucket (cloud storage), a transaction being committed to a database, a message sent to a queue, or the like. The request may also be an http request (e.g., a post request).

The serverless application may be backed up regularly, for example by a backup server 250 or other device. The server 250 may generate a manifest 220 that allows the various components of the serverless application to be identified and backed up and restored. Further, the manifest 220 is generated automatically and the backup may be performed automatically. In addition, as changes to one or more of the components of the serverless application occur, these changes may be detected and the manifest 220 may be updated or a new manifest may be generated.

A serverless application can be backed up by backing up all the services and functions that the serverless application uses. Conventionally, this is a tedious error prone manual work that requires creating a lot of pieces of the backup software and coordinating all of the various pieces. By creating the manifest 220 in an automated manner and in a manner that adapts to changes in the serverless application, the manifest 220 can be used to create consistent backups of the serverless application in a time curtained manner.

Serverless applications are dynamic and services can be easily added or removed. If a user or entity wants to restore an older point or an earlier version of the serverless application, it may be necessary to restore services that may have been removed. The manifest 220 may be a representation of a plurality of manifests, each corresponding to a point in time.

The manifest 220 represents the components of the serverless application and also represents the relationships between the components of the serverless application. In one example, the manifest 220 may be represented by a graph, such as illustrated in FIG. 2. However, the manifest 220 may also be represented in other forms.

The application functions 208 and the backend services 212 and 214 are representative of any number of, respectfully, functions and services. In creating or generating the manifest 220, A vertex may be created for each service and for each function. In this example, the service vertices 224, 224, and 230 correspond to the backend services 212 and 214. The application functions 208 may include any number of functions. The function vertices 222, 226, and 232 are added to the manifest 220.

The vertices in the manifest 220 can be created as the serverless application is parsed (e.g., as the functions are parsed or as the function's code is parsed).

Each function is then evaluated, for example by parsing the function. The triggers or conditions for the functions are identified and evaluated. If the trigger is a persistent service, an edge between the vertex of the function and the vertex of the service may be created. For example, the edge 236 between the function vertex 222 and the service vertex 224 may be created. The edge 236 may contain information or be associated with information to represent the trigger, the condition, or the relationship between the function and the service.

The environmental variables of the functions are also identified and evaluated. If an environmental variable references a service, an edge is created between the function vertex and the service vertex. In this example, the edge 238 may represent an environmental variable with respect to the function vertex 222 and the service vertex 228. The edge 238 may thus identify the environmental variable or contain information identifying the relationship between the function associated with the function vertex 222 and the service associated with the service vertex 228.

As the functions are parsed, relationships between functions (e.g., a function that calls another function) are identified. These relationships are also included in the manifest 220 as edges. The edge 234, for example, may represent a relationship between two functions and is represented as an edge 234 between the function vertex 222 and the function vertex 226. The edge 234 may also include information identifying why the function is called, parameters of the call, or the like.

The edges 240, 242, 244 and 246 similarly correspond to or identify relationships between the components of the serverless application.

Once the manifest 220 is generated, applications can be defined based on connected components. Assume, for example, that the edge 244 was not present in the manifest 244. In this case, the graph would effectively represent two serverless applications that can be backed up independently at least because they do not affect the state of each other: one with the vertices 222, 224, 2226 and 228 and one with the vertices 230 and 232.

Because the vertices 230 and 232 have no connections or edges to the other vertices, the functions and services associated with the vertices 230 and 232 have no effect on the persistent state of the functions and services associated with the vertices 222, 224, 226 and 228. As a result, the vertices 248 can be treated and backed up as a single serverless application. Similarly, the portion of the graph associated with the vertices 222, 224, 226 and 228 can be backed up as a single serverless application. When the edge 244 is present in the manifest 220, the manifest identifies or corresponds to a single application rather than two separate applications.

Figure 3:
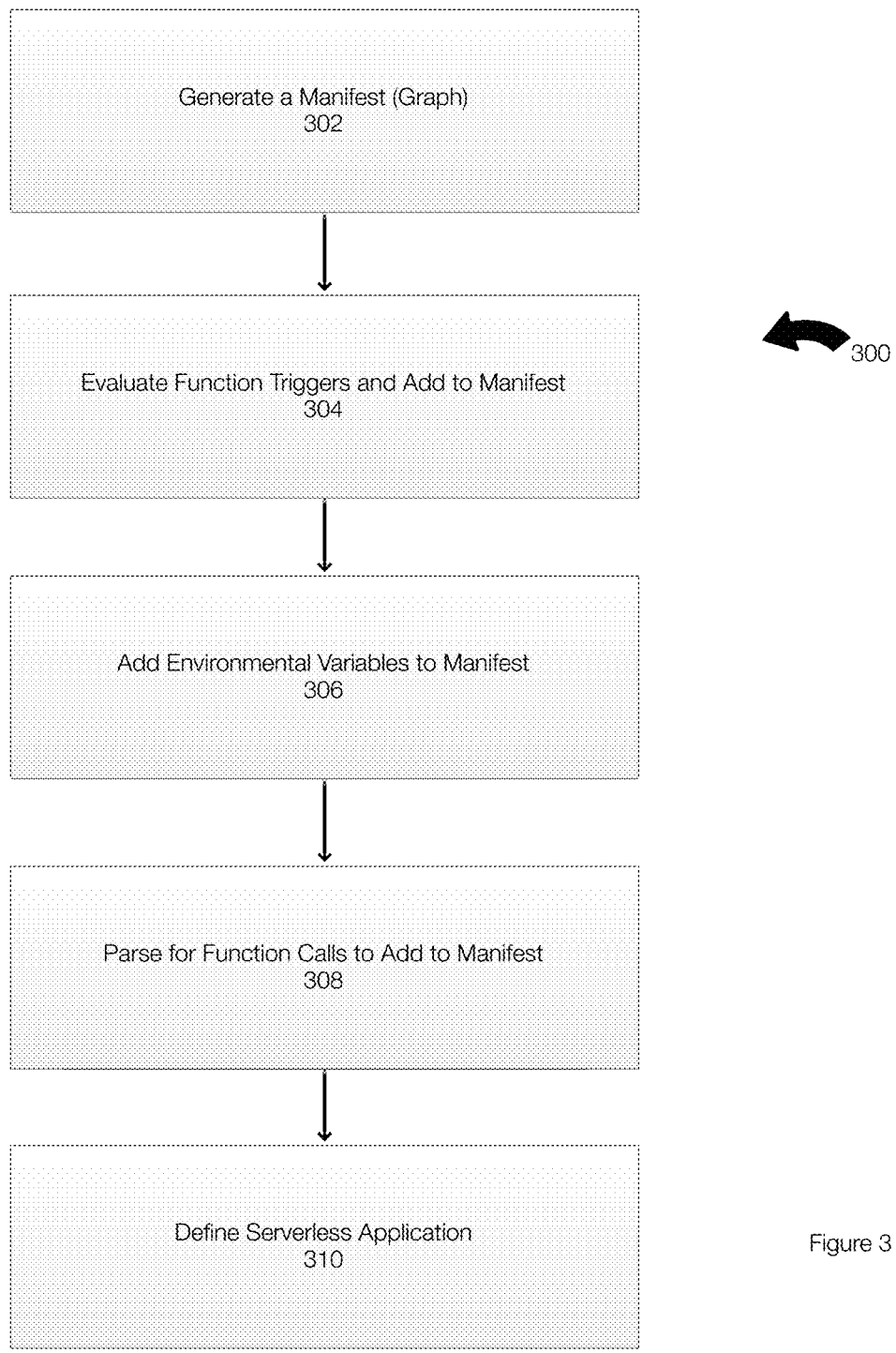
FIG. 3 is an example of a flow diagram of a method for performing a data protection operation and, more specifically, for automatically creating or generating a manifest that is used in performing the data protection operation.

FIG. 3 illustrates an example of a method 300 for generating or creating a manifest. Initially, a graph (or other representation) is generated 302. This may include establishing vertices for each function and service. The functions and services are identified, for example, by querying the serverless application and or when the code of the functions is parsed. Thus, a vertex can be added at any time during the generation of the manifest.

During or after the code is parsed, triggers are identified and added 304 to the manifest. A trigger may be associated with a request or a condition. For example, a request to upload a photo or other data to a cloud storage device may be treated as a trigger that results in a function being invoked. Thus, the trigger is related to both the function and the service. An edge is thus added to the manifest to reflect the trigger. Edges are added for all detected triggers.

Next, environmental variables are identified and added 306 to the manifest. In one example, an environmental variable is added when the environmental variable references a service. This thus reflects that the environmental variable is related to both the function and the service and should be reflected in the backup.

For example, an example of a variable can be SQLDB address=10.76.55.44:/DB/. This states that the SQL database referenced in the application is in the specified IP address. This identifies which database to backup.

The functions are then parsed 308 to identify function calls. If a function calls another function, this relationship is included in the graph.

After the functions are parsed and the graph is created, the serverless application can be defined 310. The resulting graph may result in more than one application. If a group of vertices has no connections or edges to another group of vertices, these two groups can be treated as separate applications. Of course, they can also be backed up as a single application. In one example, the lack of edges indicates that the state of one group is not dependent on the state of the other group. Thus, they can be treated separately.

After the graph is created, a backup application can be performed using the graph. The graph allows all of the related functions and services to be backed up such that the resulting backup is consistent. Services or functions that affect the state of other functions or services are protected in a consistent manner.

Example Computing Devices and Associated Media

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon.

Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for backing up a serverless application, the serverless application including backend services, application functions, and function mappings, the method comprising:

adding function vertices and service vertices to a manifest, wherein each function vertex corresponds to a function of the serverless application and each service vertex corresponds to a backend service;

identifying characteristics of each function;

adding the identified characteristics to the manifest as edges between the function vertices and the service vertices;

evaluating the manifest to identify components of the serverless application that impact a persistent state, wherein the function vertices and the service vertices that are not connected to other function vertices or service vertices by an edge are not included in the serverless application and do not impact the persistent state; and backing up the identified components as a single serverless application, wherein the function vertices and the service vertices that do not impact the persistent state of the identified components are backed up as a different serverless application.

2. The method of claim 1, wherein the characteristics include triggers, environmental variables and/or function calls.

3. The method of claim 2, wherein the manifest comprises a graph, further comprising adding the triggers, the environmental variables and/or the function calls as edges in the graph.

4. The method of claim 1, wherein the identifying characteristics of each function includes parsing each function to identity triggers, environmental variables, and/or function calls.

5. The method of claim 1, wherein the evaluating the manifest to identify the components of the serverless application that impacts a persistent state includes identifying a group of vertices connected by edges as the serverless application, wherein vertices that do not have a path to other vertices in the group of vertices are not included in the serverless application and are identified as the different serverless application.

6. The method of claim 1, further comprising querying the serverless application with one or more queries to obtain a list of functions and/or services.

7. The method of claim 6, wherein the one or more queries include a list functions command, a get function configuration command and/or a get function command.

8. The method of claim 1, further comprising detecting a change in the serverless application and generating a new manifest in response to the detected change.

9. The method of claim 8, further comprising backing up the serverless application based on the new manifest.

10. A non-transitory storage medium having stored therein instructions that are executable by one or more hardware processors to perform operations comprising:

adding function vertices and service vertices to a manifest, wherein each function vertex corresponds to a function of the serverless application and each service vertex corresponds to a backend service;

identifying characteristics of each function;

adding the identified characteristics to the manifest as edges between the function vertices and the service vertices;

evaluating the manifest to identify components of the serverless application that impact a persistent state, wherein the function vertices and the service vertices that are not connected to other function vertices or service vertices by an edge are not included in the serverless application and do not impact the persistent state; and backing up the identified components as a single serverless application, wherein the function vertices and the service vertices that do not impact the persistent state of the identified components are backed up as a different serverless application.

11. The non-transitory storage medium of claim 10, wherein the characteristics include triggers, environmental variables and/or function calls.

12. The non-transitory storage medium of claim 11, wherein the manifest comprises a graph, further comprising adding the triggers, the environmental variables and/or the function calls as edges in the graph.

13. The non-transitory storage medium of claim 10, wherein the identifying characteristics of each function includes parsing each function to identity triggers, environmental variables, and/or function calls.

14. The non-transitory storage medium of claim 10, wherein the evaluating the manifest to identify the components of the serverless application that impacts a persistent state includes identifying a group of vertices connected by edges as the serverless application, wherein vertices that do not have a path to other vertices in the group of vertices are not included in the serverless application and are identified as the different serverless application.

15. The non-transitory storage medium of claim 10, the operations further comprising querying the serverless application with one or more queries to obtain a list of functions and/or services.

16. The non-transitory storage medium of claim 15, wherein the one or more queries include a list functions command, a get function configuration command and/or a get function command.

17. The non-transitory storage medium of claim 10, the operations further comprising detecting a change in the serverless application and generating a new manifest in response to the detected change.

18. The non-transitory storage medium of claim 17, further comprising backing up the serverless application based on the new manifest.

\* \* \* \* \*